No. 708,865. Patented Sept. 9, 1902.
C. H. CHITTUM.
NUT LOCK.
(Application filed Feb. 26, 1902.)
(No Model.)
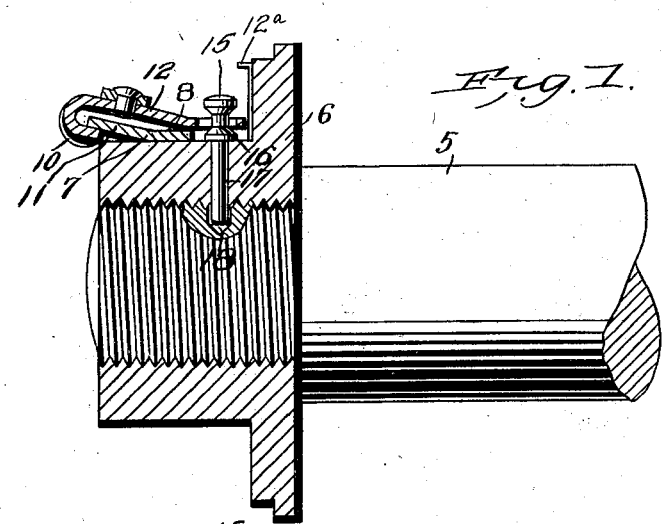
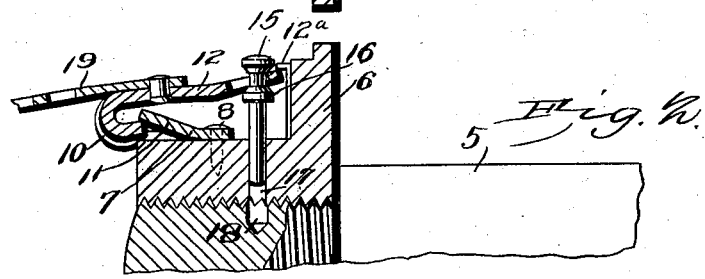
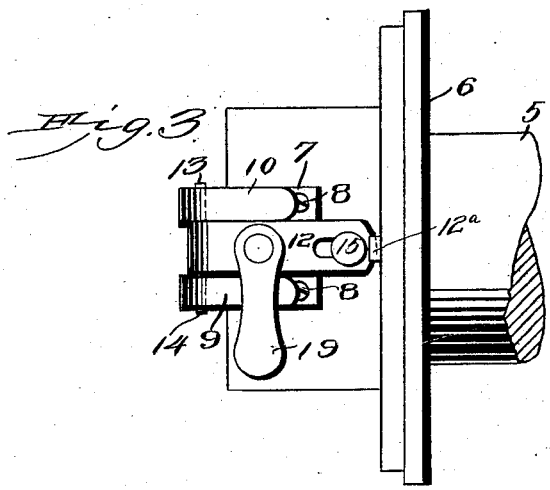
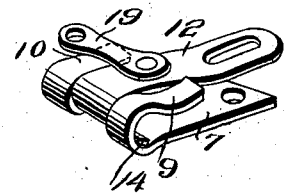
Witnesses
E. F. Stewart
C. N. Woodward
C. H. Chittum, Inventor
by C. A. Snow & Co.
Attorneys

UNITED STATES PATENT OFFICE.

CHARLES HENRY CHITTUM, OF LEXINGTON, VIRGINIA.

NUT-LOCK.

SPECIFICATION forming part of Letters Patent No. 708,865, dated September 9, 1902.

Application filed February 26, 1902. Serial No. 95,774. (No model.)

*To all whom it may concern:*

Be it known that I, CHARLES HENRY CHITTUM, a citizen of the United States, residing at Lexington, in the county of Rockbridge and State of Virginia, have invented a new and useful Nut-Lock, of which the following is a specification.

This invention relates to devices for securing nuts upon bolts or other parts, more particularly to that class of nuts requiring frequent removal.

The invention may be applied to many forms of nuts, but is more particularly applicable to securing the nuts of carriage and other axles, and for the purpose of illustration I have shown it applied to a vehicle-axle.

In the drawings, Figure 1 is a sectional side elevation of a portion of an axle and its nut with my improvement applied thereto, showing the fastener engaged. Fig. 2 is a sectional detail of the same, showing the fastener disengaged. Fig. 3 is a plan view of the parts shown in Fig. 1. Fig. 4 is a perspective view of a portion of the device detached.

The axle is represented at 5, and the wheel-retaining nut at 6, which may be of any of the well-known forms.

The attachment consists of a plate 7, attached to the nut with screws, rivets, or other fastenings 8. The outer part of this plate 7 is divided into three parts—side parts 9 and 10 and a central part 11—the side parts turned over rearwardly above the body of the plate and forming sockets and the central portion curved upward, as shown in Figs. 2 and 3, and forming a central spring-tongue. Secured in position between the parts 9 and 10 is a lever-bar 12, with studs 13 14 projecting laterally therefrom and forming journals adapted to engage the sockets formed at the points where the parts 9 and 10 turn backward over the body of the plate. The front end of the lever-bar 12 is turned downward and rearwardly and is engaged by the spring-tongue 11, which serves to retain the lever-bar yieldably in its closed position. The inner end of the lever-bar 12 is extended beyond the plate 7 and is provided with a slot 13, adapted to support a pin 14, the pin having collars or ridges 15 16 and adapted to project by its inner end through an aperture 17 in the nut 6 and into a socket or recess 18 in the axle end 5, as shown. The spring-tongue 11 will thus maintain the pin 14 yieldably in engagement with the nut and the socket in the axle end and effectually lock the nut in position and prevent its turning backward upon its thread.

Attached pivotally to the lever-bar 12 is a small operating-lever 19, adapted when turned outward, as in Fig. 2, to afford means whereby the lever-bar 12 may be forcefully actuated to elevate the pin 14 out of its seat 18, as shown in Fig. 2, and release the nut and likewise adapted to be turned inward at right angles to the bar 12 when not in use, as in Figs. 1, 3, and 4. By this simple arrangement the nut 6 may be securely "locked" upon the axle end and all danger of the nut "running off" obviated, while at the same time the nut can be very quickly and easily released when it is desired to remove it for the lubrication of the vehicle.

The construction is very simple and inexpensive and will not add materially to the expense of the vehicle.

The invention, as before stated, may be applied with only slight modification to various forms of nuts, and the construction may be varied in minor particulars without departing from the spirit of the invention.

To limit the upward movement of the spring-arm 12, a stop 12ᵃ will be attached to the nut 6, extending into the path of the free end of the spring-arms, as shown.

Having thus described my invention, I claim—

1. In a nut-lock, a plate adapted to be attached to a nut, a lever-bar pivotally supported upon said plate, a pin carried by said lever-bar and adapted to enter a cavity in the bolt engaged by said nut, and means for holding said lever-bar yieldably closed, and means for forcefully actuating said lever-bar, substantially as described.

2. In a nut-lock, the nut having a transverse aperture, a cavity in the bolt registering with said aperture, a plate disposed upon said nut, a lever-bar yieldably connected to said plate, a pin supported by said lever-bar and engaging said aperture and cavity, means for retaining said lever-bar yieldably in the closed position, and means for forcefully actuating said lever-bar to release said pin, substantially as described.

3. In a nut-lock, a plate adapted to be attached to the nut and having transverse sockets in its outer ends, a spring-tongue formed centrally of said plate between said sockets, a lever-bar having lateral journals engaging said sockets and disposed to be retained yieldably closed by said spring-tongue, and a pin supported by said lever-bar and engaging a cavity in the bolt engaged by said nut, and means for forcefully actuating said lever-bar to release said pin, substantially as described.

4. In a nut-lock, a plate adapted to be attached to the nut, a lever-bar yieldably connected to said plate, a pin supported by said lever-bar and engaging an aperture in the bolt engaged by said nut, means for retaining said lever-bar yieldably in its closed position, and an extension-lever movably attached to said lever-bar and adapted to be projected therefrom to afford means for forcefully actuating said lever-bar and its pin, substantially as described.

5. In a nut-lock, a plate adapted to be attached to the nut and having its outer end formed with side members turned backward to form lateral sockets and with a central spring-tongue, said side members and tongue being integral with said plate, a lever-bar having lateral journals integral therewith and engaging said sockets and disposed to be maintained yieldably by said spring-tongue, a pin supported by said lever-bar and engaging an aperture in the bolt engaged by said nut, and means for forcefully actuating said lever-bar to release said pin, substantially as described.

In testimony that I claim the foregoing as my own I have hereto affixed my signature in the presence of two witnesses.

CHARLES HENRY CHITTUM.

Witnesses:
FRED L. KLICKER,
W. T. SHIELDS.